Figure 1:
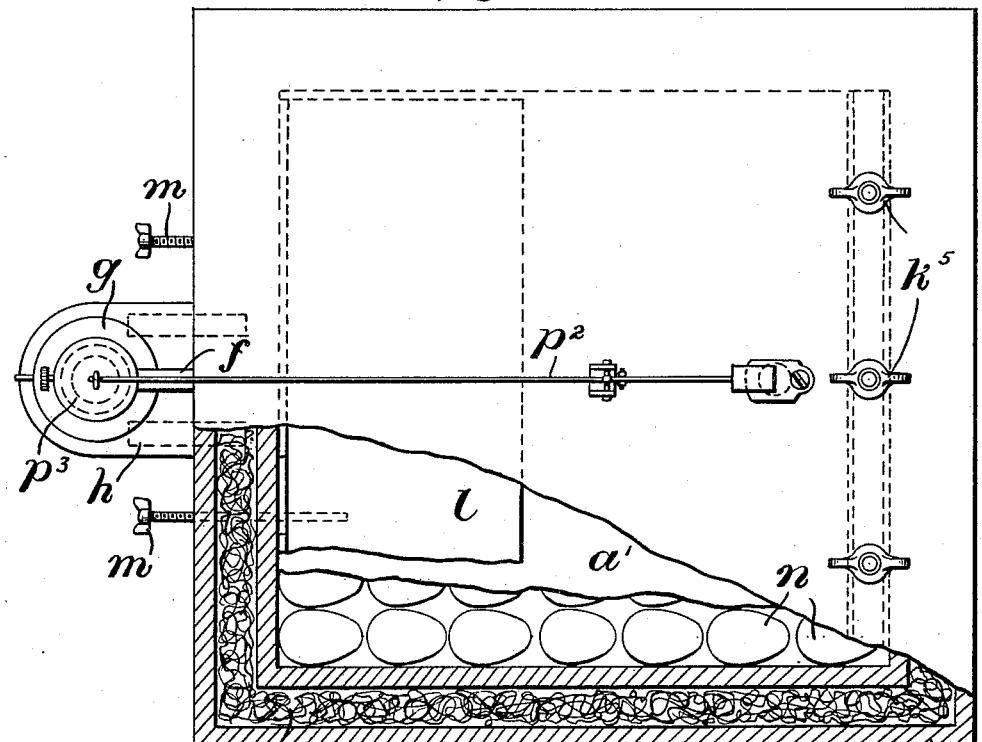

C. VON CULIN.
INCUBATOR.
APPLICATION FILED NOV. 16, 1914.

1,162,420.

Patented Nov. 30, 1915.

2 SHEETS—SHEET 1.

Attest:

Inventor:
Clayton Von Culin
by
Redding, Greeley & Goodlett
Attys

UNITED STATES PATENT OFFICE.

CLAYTON VON CULIN, OF NEW YORK, N. Y.

INCUBATOR.

1,162,420. Specification of Letters Patent. Patented Nov. 30, 1915.

Application filed November 16, 1914. Serial No. 872,327.

*To all whom it may concern:*

Be it known that I, CLAYTON VON CULIN, a citizen of the United States, residing in the borough of Manhattan of the city of New York, in the State of New York, have invented certain new and useful Improvements in Incubators, of which the following is a specification, reference being had to the accompanying drawings, forming a part hereof.

This invention relates to incubators and has for its principal object to improve generally the construction thereof whereby the highest degree of efficiency is insured, regardless of variable atmospheric conditions by which the operation of known incubators is so seriously affected.

In an incubator structure, it is necessary to consider separately the heating means and the ventilating means, and yet these separate means must be, in a sense, interdependent and susceptible of coöperation for maximum efficiency. Accordingly, in realizing the principal object of this invention, the heating and ventilating devices have been improved for the purpose of performing their respective functions in the most desirable manner, and yet, these separate devices are embodied in the incubator in such relation to each other as to subject the eggs to most advantageous incubating conditions, at all times.

Another important consideration in the construction of an incubator is the elimination, to the greatest degree possible, of the personal factor which is always present where an attendant is necessary.

It is an object of this invention to provide an incubator which shall be automatic in its action and which shall include appropriate regulating devices, both for the heating means and for the ventilating means, whereby the eggs are maintained at a constant temperature and are supplied with unstant temperature and are supplied with uncontaminated fresh air, the noxious gases being drawn off continually as the fresh air enters.

More particularly the invention seeks to improve the construction of the heating chamber by providing an improved equalizer or draft member which may be adjusted initially to control the flow of hot air through the chamber and by mounting within the chamber a baffle plate, so arranged with respect to the said draft member and the egg chamber as to cause the hot air to move generally along any desired channels and thereby subject the egg chamber or any portion thereof to a lesser or greater heating action.

Another object is to construct the heater in such manner as to adapt it for use as a nursery after the chicks are hatched.

In the bottom of the egg chamber and preferably directly below the heat flue is formed a ventilating opening which is of such area as to furnish the eggs with plenty of fresh air and yet permit the noxious gases in the egg chamber to escape therethrough, the opening referred to being, under normal conditions of operation, the only passage to the egg chamber.

The character of the invention will be described more particularly with reference to the accompanying drawings, in which—

Figure 2:
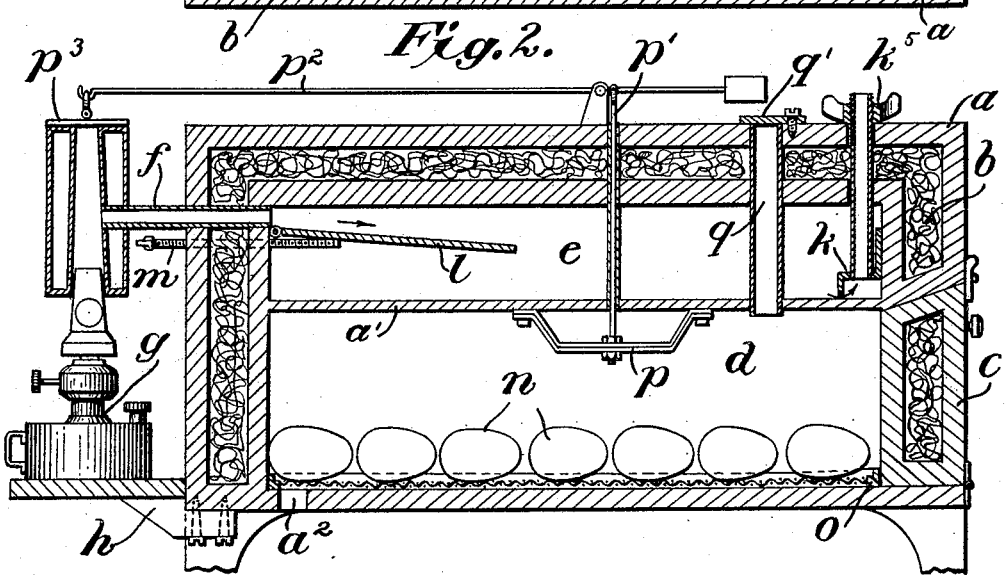
Figure 3:
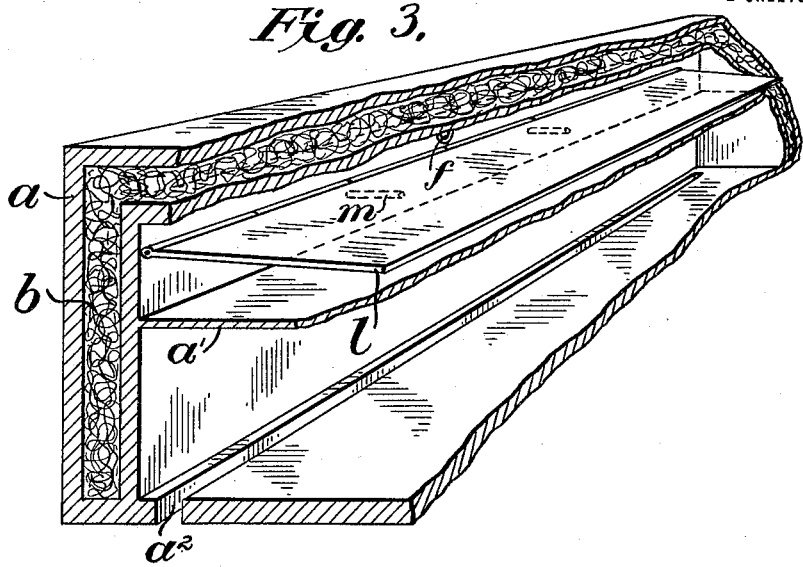
Figure 4:
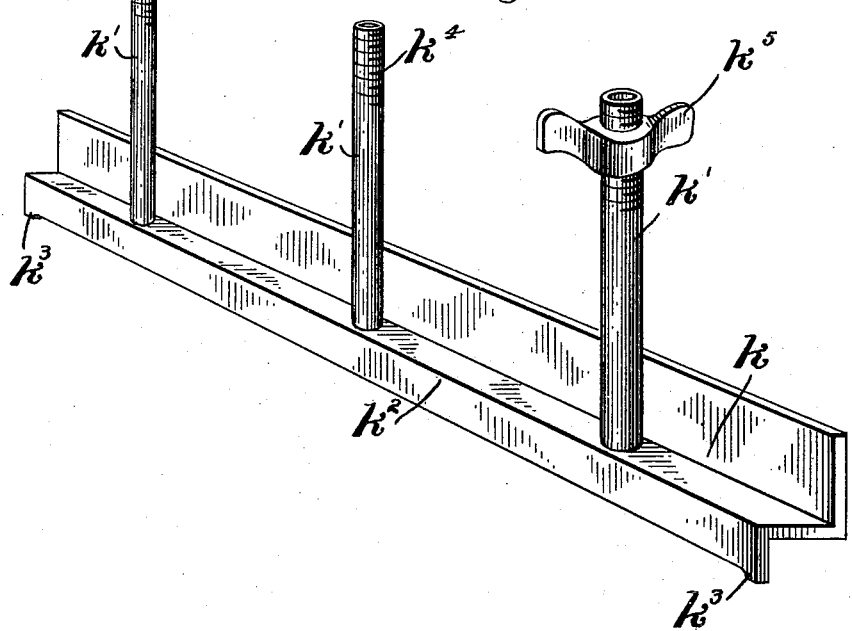

Figure 1 is a view partly in plan and partly in horizontal section of an incubator embodying the invention, parts being broken away. Fig. 2 is a view in transverse vertical section showing the relation of the heater to the egg chamber. Fig. 3 is a fragmentary view in perspective of the rear portion of the improved incubator, showing particularly the ventilating duct for the egg chamber and the baffle in the heater. Fig. 4 is a detail view in perspective and on a somewhat larger scale of the equalizer or draft member.

The incubator is preferably constructed of sheet metal and has its walls $a$ packed with mineral wool $b$ or other suitable insulating material, the front wall being provided with a suitable door $c$ to afford ready access to the egg chamber, indicated generally at $d$. The egg chamber $d$, it will be observed particularly, has no communication with the heating chamber $e$, but is separated therefrom by a horizontal partition $a'$, formed integral with, or carried by, the walls $a$ of the incubator. While the character of the material used for the partition $a'$ is not one of the essential features of the present invention, it will be desirable in practice to have it of suitable radiating properties. The heater $e$ is provided with hot air, through a flue $f$ arranged to receive heated air from any available source of heat, such as a lamp $g$, the latter being mounted conveniently at the rear side of the incubator on a bracket $h$ which may be secured to the incubator. In effecting the objects of the present invention, it is desirable that the heat flue $f$ shall pass through the rear walls $a$ of the incubator and discharge the hot gases into the heater $e$ at the upper part thereof. Provision for permitting the egress of the gases is found in an equalizer or draft member, indicated generally at $k$, this draft member being disposed at the front portion of the heater and arranged to receive the gases at the lower part of the heater, during normal operation. As will appear hereinafter, the draft member $k$ is susceptible of vertical adjustment whereby the points at which the gases leave the heater may be varied as conditions of use require.

On the rear wall $a$ of the incubator and in juxtaposition to the heat flue $f$, is hingedly mounted in a horizontal position, a baffle plate $l$ which is susceptible of angular adjustment, as through suitable thumb screws $m$, the free ends of which are exposed for manual manipulation. The baffle plate $l$ extends substantially across the heater $e$ but is preferably of less than half the length of said heating chamber so that the path of the gases from front to rear of the heater, with respect to the partition $a'$, may be controlled, within limits.

The eggs, indicated at $n$, may be supported in the egg chamber $d$ on a removable egg tray $o$, the tray being formed as a moisture pan, when desirable. Other means for introducing moisture into the egg chamber may be employed, however, as may be most convenient. The ventilation for the eggs is derived solely through a passage $a^2$ formed in the bottom of the egg chamber and adjacent the rear wall of the incubator, the cross sectional area of the ventilating passage being such as to permit a continual and ample supply of fresh and uncontaminated air to flow into the egg chamber, and the contaminated and undesirable gases, such as carbonic acid gas, to escape from the chamber at the same time. While the passage $a^2$ has been indicated to be of substantially rectangular outline and as extending entirely across the egg chamber, it is evident that a passage of the same area may be formed with a different outline, as where a number of circular holes are cut in the floor of the egg chamber. However, it is one of the important features of this invention to provide a ventilating passage of the general character described above, which is disposed in the bottom of the egg chamber and at the rear thereof, so that the fresh air shall pass upwardly into the chamber and the gases shall flow downwardly and out of the chamber, the ventilation being continued by convection through the greater density of the gas in a manner ordinarily experienced in ventilation.

The construction above described simulates more closely than any known structure, the actual conditions found where a hen is setting, it being evident that the fresh air in this case passes under the feathers of the hen and upward over the eggs, while the contaminated air passes downwardly and under the feathers to escape.

Inasmuch as one very advantageous condition has been realized in the improved incubator, to wit, the provision of a fixed and invariable ventilation for the eggs under all conditions, it, of course, becomes necessary to make adequate provision for compensation in the heating of the egg chamber, where the outside temperature or other conditions require such compensation, the result sought being the maintenance of a fixed temperature in the egg chamber, this temperature being usually around 103° F. This compensation in heating is secured, to a limited extent, by initial adjustment of the draft member $k$ and the baffle plate $l$, more delicate control and regulation being insured at all times through a thermostat $p$ mounted in the egg chamber and connected, as through a rod $p'$, and weighted lever $p^2$, to a damper $p^3$ disposed in operative relation to the source of heat $g$ and adapted by movement toward or away from the source of heat, under the action of the thermostat, to increase or decrease the flow of heated air into the heater $e$, as required.

Referring now particularly to Fig. 4 for a detailed description of the draft member $k$, it will be seen that the draft tubes $k'$ are united with a Z-bar $k^2$, the latter having its supporting flange formed at its ends with protruding portions or feet $k^3$ on which the entire member is supported. When the member rests on the feet $k^3$ the heated gases pass under the lower edge of the flange $k^2$ and out through the flues $k'$. These flues project above the top of the incubator and are threaded, as at $k^4$, to receive wing nuts $k^5$ by which the elevation of the member $k$ within the heater $e$ may be adjusted. When the member is raised from the partition $a'$, the heated gases pass freely under the Z-bar and up through the flues so that if the member is raised nearly to the top of the heater $e$ the gases will pass from the heat flue $f$ across the upper part of the heater $e$ and out of the flues $k'$ without being deflected against the radiating partition $a'$. If, on the other hand, it is desired to raise the temperature of the egg chamber or to heat it adjacent its forward portion, the member $k$ is lowered so as to rest on its feet $k^3$ and the baffle plate $l$ is adjusted to deflect the hot gases downwardly against the partition $a'$. At this time, it will be evident that the baffle plate prevents the gases from coming into close contact with the rear portion of the partition $a'$, so that the eggs directly thereunder do not receive so much heat. Such an arrangement is particularly advantageous where it is desired to hatch duck eggs or turkey eggs in the same chamber with hen eggs, the duck eggs and the turkey eggs requiring much more heat for incubation than do the hen eggs. Then, too, it is usual to test out the eggs in an incubator at the end of the seventh or tenth day to determine which eggs are likely to hatch and which are defective, the defective eggs being replaced by good eggs. Under such circumstances, it is necessary to subject the substituted eggs to a greater heat than the others. This result will be attained by placing the substituted eggs at the front portion of the egg chamber and adjusting the baffle plate $l$ in the manner described.

The improved incubator, while having an egg chamber which is provided with only one ventilating passage, is adapted for use as a nursery, by the provision of a flue $q$ from the egg chamber to the atmosphere, this flue being normally closed by a suitable damper or plate $q'$ fastened on the wall $a$ of the incubator. By opening the damper $q'$ the egg chamber may be converted into a nursery. In like manner, the heater $e$ may be used as a nursery by raising the member $k$ to its extreme elevation.

Changes in the construction may be made by those skilled in the art without departing from the spirit of the invention, provided such changes fall within the scope of the appended claims.

I claim as my invention:—

1. An incubator comprising an egg chamber, a heating chamber disposed directly thereover, a partition of radiating material disposed between said chambers to separate them absolutely, means for supplying heat to the heating chamber through one wall thereof, a single ventilating passage of predetermined area formed in the floor of the egg chamber along the aforesaid wall, a horizontally disposed baffle plate in the heating chamber hinged along the aforesaid wall and directly beneath the flue and devices for adjusting the angular position of said baffle plate with respect to the radiating partition.

2. In an incubator, a heating chamber, a flue disposed in one wall thereof to supply hot air thereto and an adjustable draft member disposed along the opposite wall and adjustable vertically to vary the zone of escape of the hot air, said draft member comprising a supporting frame, tubes formed therewith and passing out through the top wall of the heating chamber, and coöperating wing nuts carried by the tubes to permit the said vertical adjustment.

3. An incubator comprising an egg chamber, a heating chamber disposed directly thereover, a partition of radiating material disposed between said chambers to separate them absolutely, a flue disposed in one wall thereof and in the upper portion to supply hot air thereto, a horizontally disposed baffle plate hinged along said wall and directly beneath the said flue, devices for adjusting the angular position of said baffle plate with respect to the radiating partition, whereby the hot gases may be deflected toward or away from said partition, a ventilating passage formed in the floor of the egg chamber and along the same wall as that to which the said baffle plate is hinged, said ventilating passage being of predetermined area, and a thermostat disposed within the egg chamber and connected relatively with the source of hot air for the flue to control the supply.

This specification signed and witnessed this 2nd day of November, A. D. 1914.

CLAYTON VON CULIN.

Signed in the presence of—
E. M. TAYLOR,
WORTHINGTON CAMPBELL.

Copies of this patent may be obtained for five cents each, by addressing the "Commissioner of Patents, Washington, D. C."